United States Patent
Chang et al.

(10) Patent No.: US 8,488,721 B2
(45) Date of Patent: Jul. 16, 2013

(54) ADAPTIVE QRD-M ALGORITHM BASED SIGNAL DETECTING METHOD BY USING CONSTELLATION SET GROUPING IN SPATIAL MULTIPLEXING MULTIPLE-INPUT MULTIPLE-OUTPUT SYSTEM

(75) Inventors: Kyung Hi Chang, Seoul (KR); Manar Mohaisen, Incheon (KR); Hong Sun An, Incheon (KR); Young Seok Baek, Daejeon (KR); Bon Tae Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 423 days.

(21) Appl. No.: 12/853,441

(22) Filed: Aug. 10, 2010

(65) Prior Publication Data

US 2011/0044407 A1  Feb. 24, 2011

(30) Foreign Application Priority Data

Aug. 20, 2009 (KR) .................. 10-2009-0076965
Jan. 28, 2010 (KR) .................. 10-2010-0007879

(51) Int. Cl.
*H04L 27/06* (2006.01)

(52) U.S. Cl.
USPC ........... 375/340; 375/347; 375/267; 455/101; 455/277.1; 370/208; 370/334

(58) Field of Classification Search
USPC 375/340, 347, 267; 455/101, 277.1; 370/208, 370/334
See application file for complete search history.

(56) References Cited

U.S. PATENT DOCUMENTS

| | | | |
|---|---|---|---|
| 8,005,170 B2 * | 8/2011 | Lee et al. ............ | 375/341 |
| 8,018,828 B2 * | 9/2011 | Song et al. .......... | 370/203 |
| 2008/0089446 A1 * | 4/2008 | Lee et al. ............ | 375/333 |
| 2008/0187066 A1 * | 8/2008 | Wang et al. ......... | 375/267 |
| 2008/0298491 A1 | 12/2008 | Jung et al. | |
| 2010/0150274 A1 * | 6/2010 | Dai et al. ............ | 375/340 |
| 2010/0157785 A1 * | 6/2010 | Song et al. .......... | 370/203 |

FOREIGN PATENT DOCUMENTS

WO  WO 2009/077843 A3   6/2009

OTHER PUBLICATIONS

Manar Mohaisen et al., "Adaptive Parallel and Iterative QRDM Algorithms for Spatial Multiplexing MIMO Systems", Vehicular Technology Conference Fall, Sep. 20-23, 2009, IEEE.

Wei Peng et al., "Improved QRM-ML Detection with Candidate Selection for MIMO Multiplexing Systems", TENCON 2007—2007 IEEE Region 10 Conference, Taipei, Oct. 30-Nov. 2, 2007.

Kyeong Jin Kim et al., "A QRD-M/Kalman Filter-Based Detection and Channel Estimation Algorithm for MIMO-OFDM Systems", IEEE Transactions of Wireless Communications. Mar. 2005, pp. 710-721, vol. 4, No. 2, IEEE.

"Combined Search and Examination Report for GB1013549.9", GB Intellectual Property Office, Nov. 19, 2010.

* cited by examiner

*Primary Examiner* — Shuwang Liu
*Assistant Examiner* — Nader Bolourchi

(57) ABSTRACT

There is provided a signal detecting method using constellation set grouping in a spatial multiplexing multiple input multiple output system. The signal detecting method includes dividing a set of candidate symbols, a constellation set into a plurality of subsets by grouping the constellation set; dividing a tree search process of a QR-decomposition with M-algorithm (QRDM) algorithm into a plurality of partial detection phases; and performing the plurality of divided partial detection phases in parallel or iteratively.

9 Claims, 11 Drawing Sheets

Input: y, R, m, $A_j$ for $j = 1$ to $G$, $\Omega$, $N$, $X$
1: $i \Leftarrow N$
2: $K \Leftarrow G$
3: while $i > 0$ do
4:    for $k = 1$ to $K$ do
5:      if $i = N$ then
6:        Calculate branch metric for all possible symbol replicas $x_N \in A_k$
7:      else
8:        Extend all retained branches to all possible replicas $x_i \in \Omega$
9:      end if
10:     Find the minimum accumulative branch metric $E_{i,min}^k$
11:    end for
12:    if $i \neq 1$ then
13:      Find $E_{i,min} = \min \{E_{i,min}^1, E_{i,min}^2, \cdots, E_{i,min}^K\}$
14:      Calculate the threshold $\Delta_i = E_{i,min} + X\sigma_n^2$
15:      for $k = 1$ to $K$ do
16:        Exclude all replicas with (accumulative metric $> \Delta_i$)
17:        Retain at most $m_i$ symbol replicas
18:        if retained symbol replicas $= 0$ then
19:          $K \Leftarrow K - 1$
20:        end if
21:      end for
22:      $i \Leftarrow i - 1$
23:    else
24:      for $k = 1$ to $K$ do
25:        Find the solution $\hat{x}^k$ with the minimum accumulative metric $E_{1,min}^k$
26:      end for
27:    end if
28: end while
29: $k = \arg\min_{i=1,\cdots,K} E_{1,min}^i$
30: $\hat{x} \Leftarrow \hat{x}^k$
Output: $\hat{x}$

FIG. 4

Input: y, R, m, $A_j$ for $j = 1$ to $G$, $\Omega$, $N$, $X$, $\zeta = \infty$
1: $K = G$
2: for $k = 1$ to $G$ do
3:    $i \Leftarrow N$
4:    while $i > 0$ do
5:      if $i = N$ then
6:        Calculate branch metric for all possible symbol replicas $x_N \in A_k$
7:      else
8:        Extend all retained branches to all possible symbol replicas $x_i \in \Omega$
9:      end if
10:     Find the minimum accumulative branch metric $E^k_{i,min}$
11:     if $E^k_{i,min} > \zeta$ then
12:        $K \Leftarrow K - 1$
13:        Break
14:     else
15:        Calculate the threshold
           $\Delta^k_i = \min\{\zeta, E^k_{i,min} + X\sigma^2_n\}$
16:     end if
17:     if $i \neq 1$ then
18:        Exclude all replicas with (accumulative metric $> \Delta^k_i$)
19:        Retain at most $m_i$ symbol replicas
20:     else
21:        Find the solution $\hat{x}^k$ with the minimum accumulative metric $E^k_{1,min}$
22:        if $E^k_{1,min} < \zeta$ then
23:           $\zeta = E^k_{1,min}$
24:           $\hat{x} \Leftarrow \hat{x}^k$
25:        end if
26:     end if
27:     $i \Leftarrow i - 1$
28:    end while
29: end for
Output: $\hat{x}$

FIG. 6

ADAPTIVE QRD-M ALGORITHM BASED SIGNAL DETECTING METHOD BY USING CONSTELLATION SET GROUPING IN SPATIAL MULTIPLEXING MULTIPLE-INPUT MULTIPLE-OUTPUT SYSTEM

CROSS-REFERENCE TO RELATED APPLICATIONS

This application claims the priorities of Korean Patent Application Nos. 10-2009-0076965 filed on Aug. 20, 2009 and 10-2010-0007879 filed on Jan. 28, 2010, in the Korean Intellectual Property Office, the disclosures of which are incorporated herein by reference.

BACKGROUND OF THE INVENTION

1. Field of the Invention

The present invention relates to a signal detecting method using constellation set grouping in a spatial multiplexing multiple-input multiple-output system, and more particularly, to a technology capable of reducing detection delay, hardware demands, and operation complexity as compared to the existing QRDM algorithm, by dividing a tree search process of a QR-decomposition with M-algorithm (QRDM) algorithm into a plurality of partial detection phases and performing the partial detection phases in parallel or iteratively.

2. Description of the Related Art

A multiple-input multiple-output (MIMO) system using a multiple antenna is a system in which the transmitter/receiver uses a multiple antenna. The MIMO system can increase channel transmission capacity in proportion to the number of antennas without allocating additional frequency or transmission power, as compared to a system using a single antenna. Therefore, research into the MIMO system has been actively undertaken.

The channel capacity of the MIMO system mainly depends on a signal detecting method used in a receiver in order to recover blocks of transmitted symbols. It is important to design the signal detecting method of the MIMO system so that high performance and low complexity and detection delay are achieved.

An example of the signal detecting method of the MIMO system may include a maximum likelihood (ML) detecting method, a sphere decoding algorithm, a QR-decomposition with M-algorithm (QRDM) algorithm, an adaptive QRDM (AQRDM) algorithm, and so on.

Although the maximum likelihood detecting method provides optimal performance in a multiple multiplexing multiple-input multiple-output system, the operational complexity exponentially increases when the number of transmitting antennas increases and a higher order modulation method is used. Therefore, there is a disadvantage in that the maximum likelihood detecting method is not practically used.

The sphere decoding algorithm provides performance similar to that of the maximum likelihood detecting method and the significantly reduced average operation complexity as compared to the maximum likelihood detecting method. However, the sphere decoding algorithm instantaneously changes complexity due to the condition number of a channel matrix and the noise dispersion. As a result, the sphere decoding algorithm represents an operational complexity similar to the maximum likelihood method in a worst case scenario. In other words, the operational complexity of the sphere decoding algorithm has a large standard deviation and randomness. Therefore, it is difficult to apply the sphere decoding algorithm to applications where a mobile base station has limited power and low detection latency tolerance.

The QRDM algorithm is provided as a compromise between performance and complexity. In the QRDM algorithm, the amount of computation required to detect signals is fixed regardless of channel conditions or noise power. Therefore, the QRDM algorithm detecting the signals considers more information at each process, thereby making it possible to further reduce the operational complexity. In other words, when there is well-conditioned channel environment or low noise power, the QRDM algorithm reduces the number of remaining candidate symbols, thereby making it possible to reduce operations relating to accumulated distances to be calculated at each branch. However, there are problems, in that the detection performance depends on the number of selected candidates and the more the number of candidates, the larger the operational complexity becomes.

The AQRDM algorithm adaptively controls the number of remaining branches, unlike the above-mentioned QRDM algorithm, which fixes the number of branches remaining at each detecting process. Since the estimated accumulated distances in a high signal to noise ration (SNR) region show a clear difference from the accumulated distance of other remaining candidate symbols, the AQRDM algorithm can significantly reduce complexity. However, the AQRDM algorithm has a level of complexity similar to the existing QRDM algorithm in a low signal to noise ratio region where the accumulated distances of many symbol candidates have a similar level.

SUMMARY OF THE INVENTION

An aspect of the present invention provides a signal detecting method using constellation set grouping in a spatial multiplexing multiple-input multiple-output system capable of reducing detection delay, hardware demands, and operation complexity as compared to the existing QRDM algorithm by dividing a tree search process of a QRDM (QR-decomposition with M-algorithm) algorithm into a plurality of partial detection phases and performing the plurality of partial detection phases in parallel or iteratively.

According to an aspect of the present invention, there is provided a signal detection method including: dividing a set of candidate symbols, a constellation set, into a plurality of subsets by grouping the constellation set; dividing a tree search process of a QR-decomposition with M-algorithm (QRDM) algorithm into a plurality of partial detection phases; and performing the plurality of divided partial detection phases in parallel or iteratively.

BRIEF DESCRIPTION OF THE DRAWINGS

The above and other aspects, features and other advantages of the present invention will be more clearly understood from the following detailed description taken in conjunction with the accompanying drawings, in which:

FIG. 4 is a diagram showing the APQRDM algorithm according to the exemplary embodiment of the present invention as a pseudo code;

FIG. 6 is a diagram showing the AIQRDM algorithm according to another exemplary embodiment of the present invention as a pseudo code;

DETAILED DESCRIPTION OF THE PREFERRED EMBODIMENT

Figure 1:
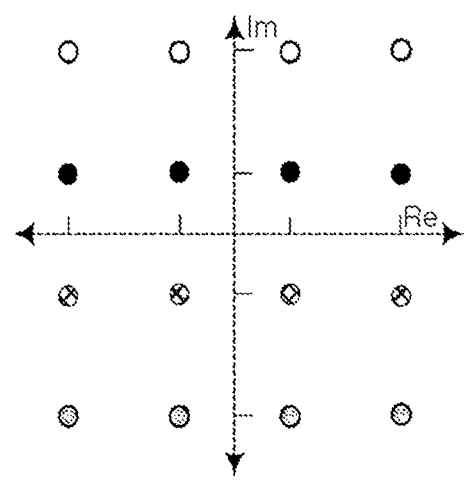
FIG. 1 is a diagram showing a continuous grouping method when G=4 and a 16 QAM modulation method is used.

Exemplary embodiments will now be described in detail with reference to the accompanying drawings so that they can be easily practiced by a person skilled in the art to which the present invention pertains. However, in describing the exemplary embodiments of the present invention, detailed descriptions of well-known functions or constructions are omitted so as not to obscure the description of the present invention with unnecessary detail. In addition, like reference numerals denote parts performing similar functions and actions throughout the drawings.

Throughout this specification, when it is described that an element is "connected" to another element, the element may be "directly connected" to another element or "indirectly connected" to another element through a third element. In addition, unless explicitly described otherwise, "comprising" any components will be understood to imply the inclusion of other components but not the exclusion of any other components.

A signal detecting method according to an exemplary embodiment of the present invention is based on a technology of dividing a set of candidate symbols (that is, constellation set) considering all the symbols that can be included in the used modulation method into a subset having the same cardinality by continuous or dispersive grouping. Therefore, a tree search process of the existing QRDM algorithm is divided into partial detection phases having less remaining branches at each detecting level and if necessary, the partial detection phases may be performed in parallel or iteratively.

Hereinafter, the grouping method and the signal detecting method used in the present invention will be described in more detail with reference to FIGS. 1 to 8B.

The constellation set $\Omega$ may be divided into G subsets $A_1$, $A_2, \ldots, A_G$ that does not have common elements as shown by Equation 1.

$$\Omega = \bigcup_{i=1}^{G} A_i \quad \text{Equation 1}$$

The grouping method of the constellation set is largely divided into the continuous grouping method and the dispersive grouping method.

In detail, the continuous grouping method is a method for continuously selecting the candidate symbols belonging to each group on the constellation and the dispersive method is a method for sequentially selecting the symbol candidates belonging to each group on the constellation according to the number (G) of groups. As shown in FIG. 1 or FIGS. 2A to 2C, the candidate symbols can be grouped continuously or dispersively.

Figures 2A, 2B:
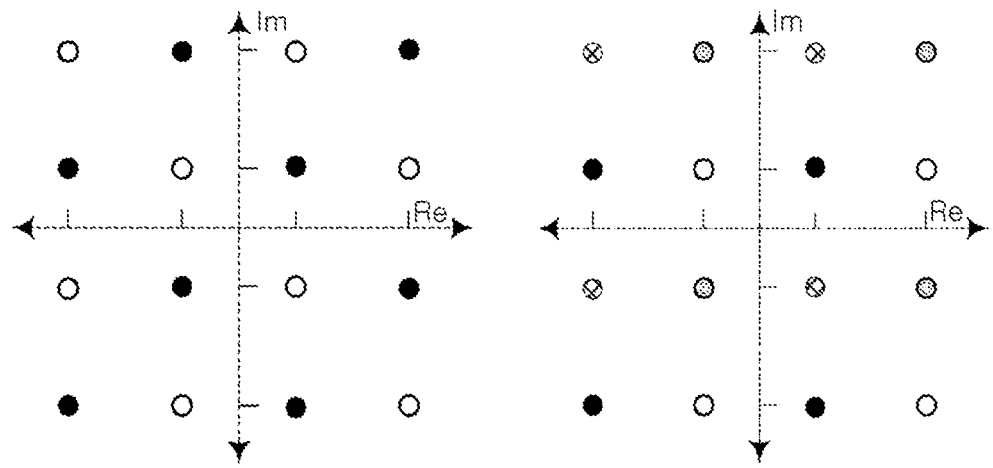
FIG. 2A is a diagram showing a dispersive grouping method when G=2 and the 16 QAM modulation method is used.
FIG. 2B is a diagram showing the dispersive grouping method when G=4 and the 16 QAM modulation method is used.
Figure 2C:
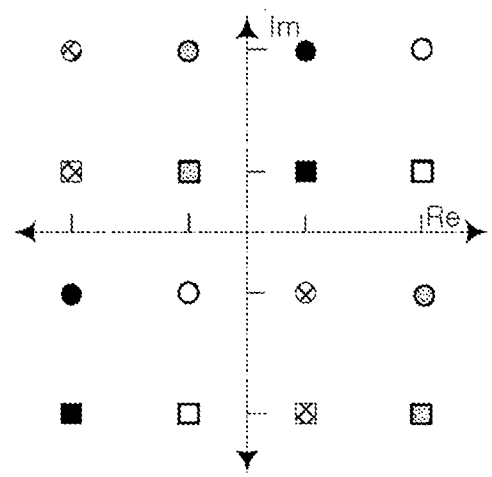
FIG. 2C is a diagram showing a dispersive grouping method when G=8 and the 16 QAM modulation method is used.

FIG. 1 is a diagram showing the continuous grouping method when G=4 and the 16 QAM modulation method is used. FIG. 2A is a diagram showing the dispersive grouping method when G=2 and the 16 QAM modulation method is used, FIG. 2B is a diagram showing the dispersive grouping method when G=4 and the 16 QAM modulation method is used, and FIG. 2C is a diagram showing a dispersive grouping method when G=8 and the 16 QAM modulation method is used.

In FIG. 1 and FIGS. 2A to 2C, it may be seen that the same symbols belong to the same groups and each group divided by the continuous or dispersive grouping method has the same average power.

Hereinafter, $G_1^a$ and $G_2^a$ each represent the continuous grouping method and the dispersive grouping method when G=a.

In the exemplary embodiment of the present invention, a tree search process of a QRDM algorithm is divided into a plurality of partial detection phases (PDPs) according to the above-mentioned grouping method. Further, a symbol determined at an $N^{th}$ detecting level of an $i^{th}$ PDP is selected among elements of $A_i$. Further, the maximum value of the number of branches remaining at each detecting level is preset to vector $m=[m_2, m_3, \ldots, m_N]$. For example, when the number N of transmitting antennas is 4, the vector m is defined by Equation 2. Herein, a is defined by M/G and M is the number of candidates remaining at each detecting phase of a tree structure.

$$m_0^4 = \{a, a, a\} \quad \text{Equation 2}$$
$$m_1^4 = \left\{\frac{a}{2}, \frac{3a}{2}, a\right\}$$

An adaptive parallel QRDM (APQRDM) algorithm according to an exemplary embodiment of the present invention processes the PDPs in parallel divided according to the above-mentioned description to reduce detection delay and reduce operation complexity.

Figure 3A:
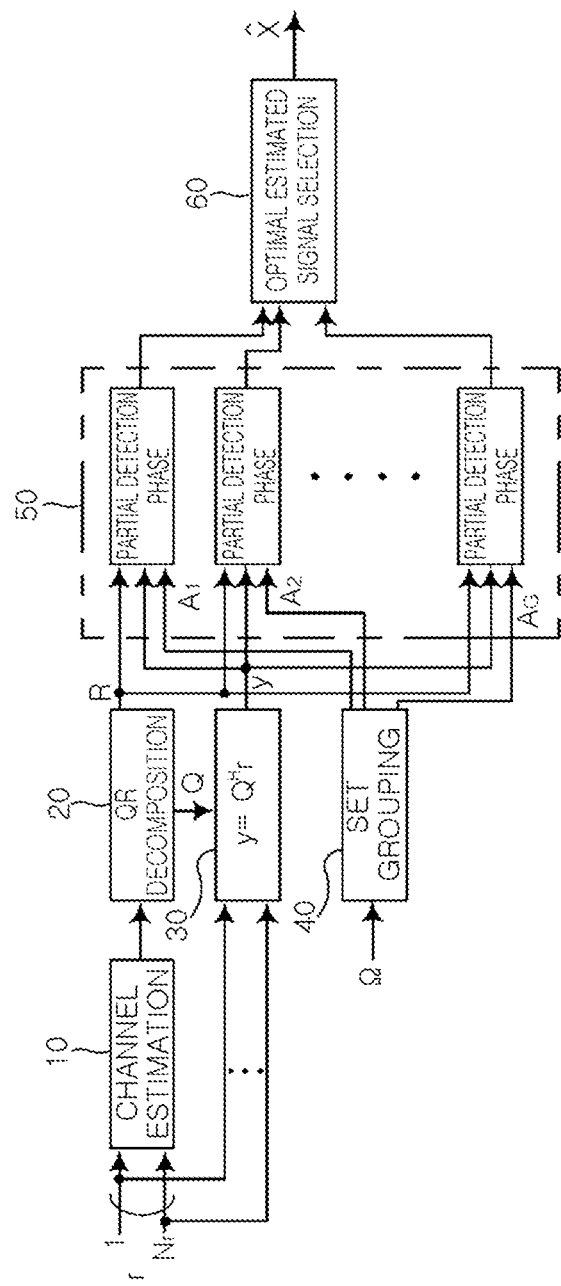
FIG. 3A is a block diagram showing an APQRDM algorithm according to an exemplary embodiment of the present invention.
Figure 3B:
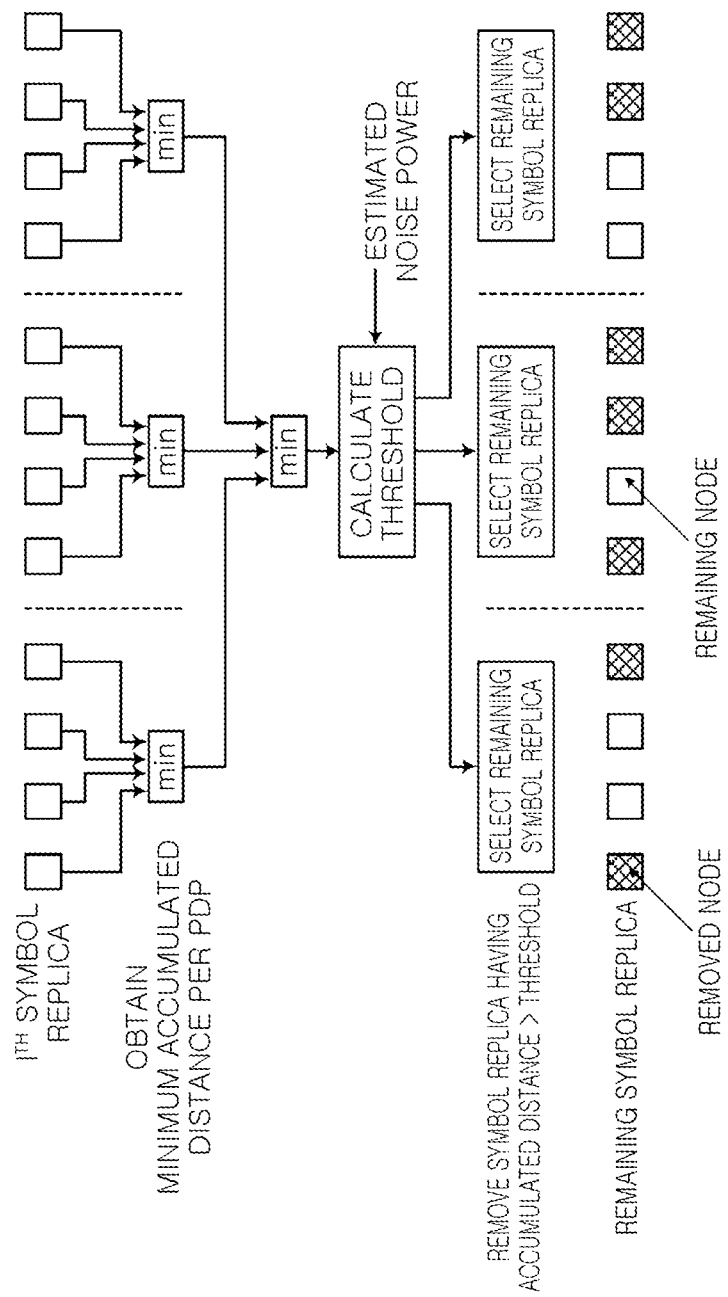
FIG. 3B is a diagram showing the selection of remaining symbols when the APQRDM algorithm according to the exemplary embodiment of the present invention is applied.

FIG. 3A is a block diagram showing an APQRDM algorithm according to an exemplary embodiment of the present invention and FIG. 3B is a diagram showing the selection of remaining symbols when the APQRDM algorithm according to the exemplary embodiment of the present invention is applied.

Referring to FIG. 3A, a channel matrix H is estimated from a signal r received through a multiple antenna (10) and is decomposed to obtain a unitary matrix Q and an upper triangle matrix R (r=QRs+n; r is a receiving signal vector, s is a transmitting signal vector, and n is a noise vector) (20) and then, $Q^H$ is multiplied by both sides of the above Equation (30).

Meanwhile, the exemplary embodiment of the present invention groups set Ω into G subsets $A_1, A_2, \ldots, A_G$ by the above-mentioned continuous grouping method or the dispersive grouping method (40).

As a result, the tree search process of the existing QRDM algorithm is divided into the plurality of partial detection phases (50), each of the partial detection phases uses the existing AQRDM algorithm, and the symbols determined at an $N^{th}$ detecting level of an $i^{th}$ partial detection phase are selected among elements of $A_i$.

Each of the partial detection phases (50) calculates the distances of each branch and calculates the minimum accumulated distances per the PDP.

In particular, the minimum accumulated distances at each detecting level are calculated according to the following Equation 3. Herein, $E_N^j$ represents the minimum distance of symbol $x_N$. $A_j$ selected at an $N^{th}$ detecting level of a $j^{th}$ PDP.

$$E_{N,min} = \min\{E_{N,min}^1, E_{N,min}^2, \ldots, E_{N,min}^G\} \qquad \text{Equation 3}$$

After the minimum accumulated distances are calculated, thresholds are calculated based on the calculated minimum accumulated distances according to Equation 4. The description of Equation 4 is disclosed in IEEE Journal of Selected Areas in Communications, vol. 24, no. 6, pp. 1130-1140, June 2006, entitled "Adaptive control of surviving symbol replica candidates in QRM-MLD for OFDM-MIMO multiplexing" by H. Kawai, K. Higuchi, N. Maeda, M. Sawahashi and therefore, a detailed description thereof will be omitted.

$$\Delta_N = E_{N,min} + X\sigma_n^2 \qquad \text{Equation 4}$$

Thereafter, the symbols having the minimum accumulated distances calculated at each detecting level larger than the thresholds are removed. Next, when the number of remaining symbols, after being symbol removal, is larger than the preset value $m_N$, only $m_N$ symbols having the minimum accumulated distances among the remaining symbols are selected and the other symbols are removed. On the other hand, when the number of remaining symbols is smaller than the preset value $m_N$, all remaining symbols are used in a subsequent detecting level.

The above-mentioned processes are iteratively performed at each detecting level, such that the optimal estimated signals and the accumulated distances of the corresponding estimated signals are obtained at each detecting step. The obtained estimated signals and accumulated distance are stored as $\hat{x}^k$ and $E_{1,min}^k$ and the minimum accumulated distance is selected among the stored accumulated distances and the estimated signals corresponding to the minimum accumulated distances are selected as optimal values (60).

FIG. 4 is a diagram showing the APQRDM algorithm according to the exemplary embodiment of the present invention as a pseudo code. The above-mentioned APQRDM process is represented by the pseudo code.

Meanwhile, the adaptive iterative QRDM (AIQRDM) algorithm according to another exemplary embodiment of the present invention is to reduce the hardware demands and operational complexity by iteratively processing the PDPs divided according to the above description.

Figure 5:
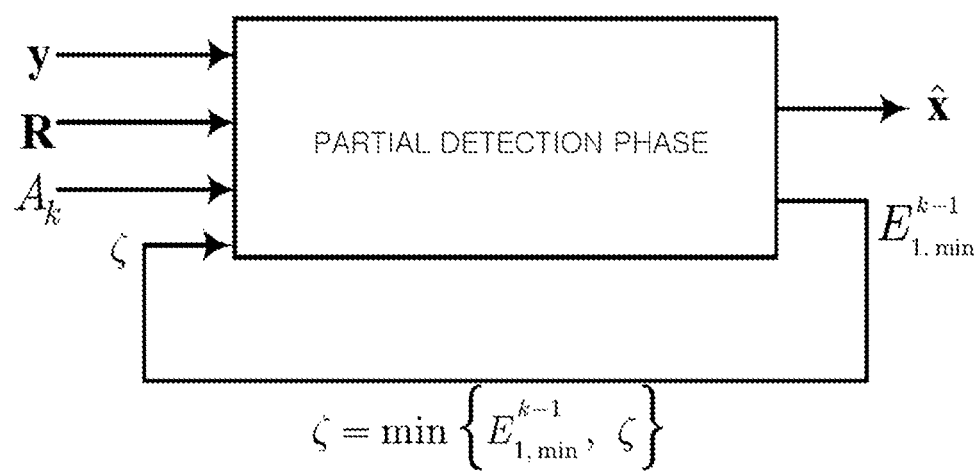
FIG. 5 is a diagram showing architecture of an AIQRDM algorithm according to another exemplary embodiment of the present invention.

FIG. 5 is a diagram showing the architecture of an AIQRDM algorithm according to another exemplary embodiment of the present invention.

Referring to FIG. 5, the iteratively performed partial detection phase receives y, R, $A_k$, and ζ as inputs. Herein, y is a received signal vector, R is an R matrix obtained by performing the QR decomposition on the channel matrix, and ζ is an accumulated distance corresponding to an optimal signal x estimated until now. The initial ζ value is initialized at an infinite value.

Similar to the above-mentioned APQRDM algorithm, the existing AQRDM algorithm is applied at each of the divided partial detection phases and the symbol determined at the $N^{th}$ partial detecting level of the $i^{th}$ partial detection phase is selected among the elements of $A_i$. In addition, the threshold at the detecting level i is calculated according to Equation 5.

$$\Delta_i^1 = E_{i,min}^1 + X\sigma_n^2 \qquad \text{Equation 5}$$

The symbols having the accumulated distance larger than the thresholds calculated according to the above description are removed and when the number of remaining symbols after being symbol removal is larger than the preset value $m_i$, only the $m_i$ symbols having the minimum accumulated distances among the remaining symbols are selected for the subsequent detecting level and the other symbols are removed. On the other hand, when the number of remaining symbols is smaller than the preset value $m_i$, all the remaining symbols are used in a subsequent detecting level.

The above-mentioned processes are iteratively performed at each detecting level, the ζ value obtained according to the following Equation 6 is defined as the accumulated distance of the optimal values obtained until now. The detecting signal $\hat{x}$ stores $\hat{x}^1$.

$$\zeta = \Delta_1^1 = \|y - R\hat{x}^1\|^2 \qquad \text{Equation 6}$$

The first detected symbol at a $k^{th}$ iterative detecting process is selected from the constellation subset $A_k$, but the remaining symbols are selected from the entire constellation set Ω. In order to detect $x_N$ symbols, the minimum accumulated distance $E_{1,min}^k$ is calculated, which is, in turn, compared with the ζ value. In case of $\zeta \leq E_{1,min}^k$, since the already detected symbols have the accumulated distances smaller than the current detecting symbols, the iterative process stops without correcting the ζ value or the detecting signal $\hat{x}$. On the other hand, in case of $\zeta > E_{1,min}^k$, the thresholds are calculated according to Equation 7. The corrected thresholds present stricter conditions, such that operation complexity can be further reduced.

$$\Delta_i^k = \min\{\zeta, E_{i,min}^k + X\sigma_n^2\} \qquad \text{Equation 7}$$

FIG. 6 is a diagram showing the AIQRDM algorithm according to another exemplary embodiment of the present invention as a pseudo code. The above-mentioned AIQRDM process is represented by the pseudo code.

Figure 7A:
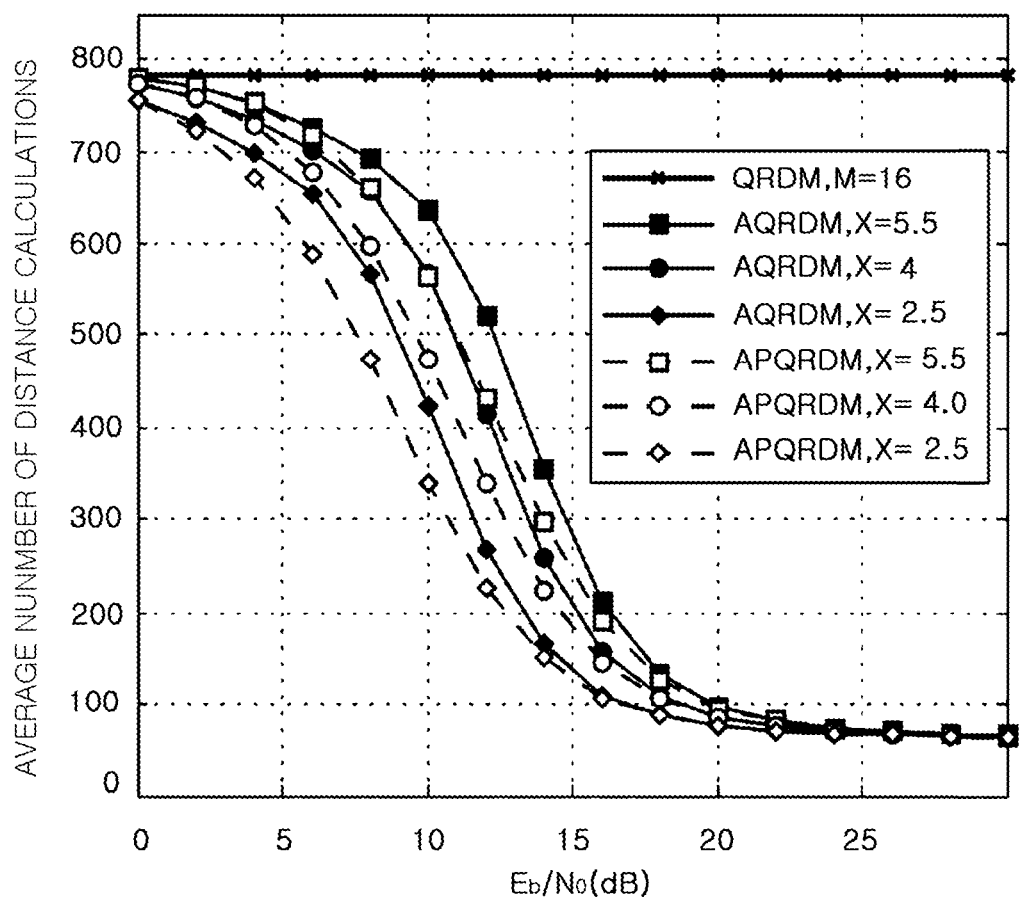
FIG. 7A is a diagram showing the operation complexity of the APQRDM algorithm when in the 4×4 MIMO system, X and G=4 and a 16QAM modulation method is used.
Figure 7B:
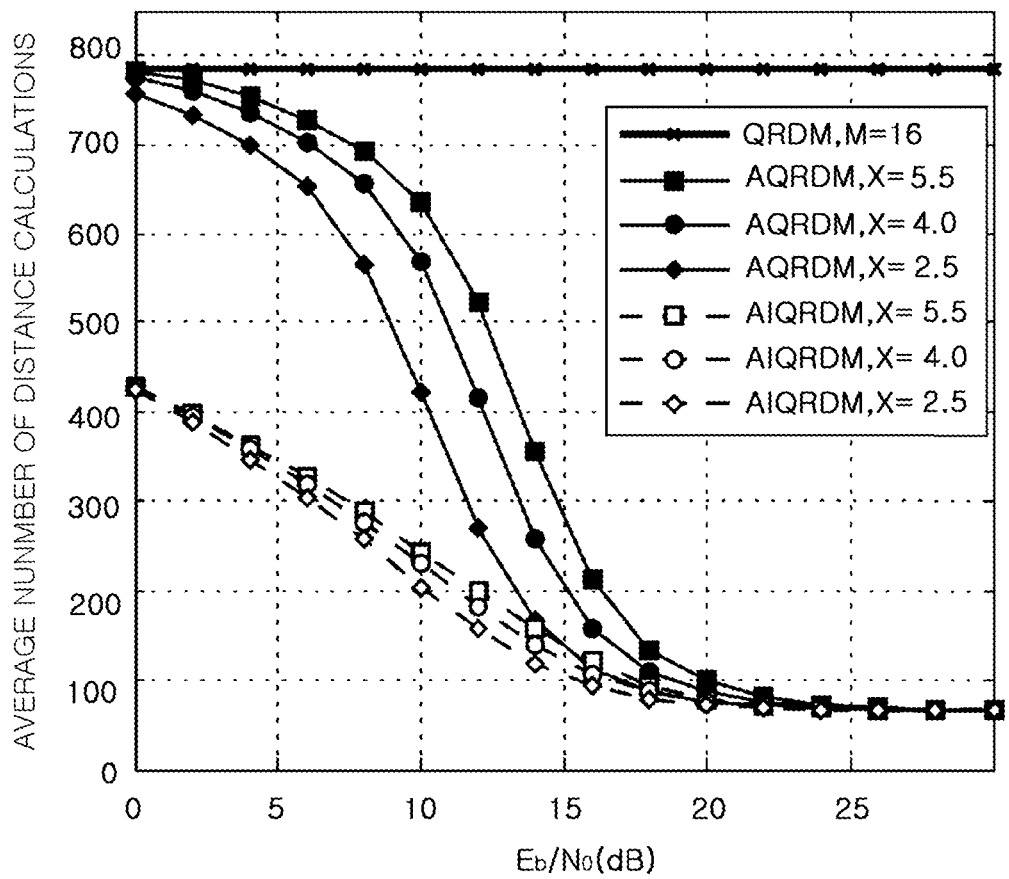
FIG. 7B is a diagram showing the operation complexity of the AIQRDM algorithm when in the 4×4 MIMO system, X and G=4 and the 16QAM modulation method is used.

FIG. 7A is a diagram showing the operation complexity of the APQRDM algorithm when in the 4×4 MIMO system, X and G=4 and a 16QAM modulation method is used and FIG. 7B is a diagram showing the operation complexity of the AIQRDM algorithm when in the 4×4 MIMO system, X and G=4 and the 16QAM modulation method is used. It can be appreciated from FIGS. 7A and 7B that the APQRDM and AIQRDM algorithm according to the exemplary embodiment can reduce operation complexity as compared with the existing QRDM and AQRDM algorithms.

Figure 8A:
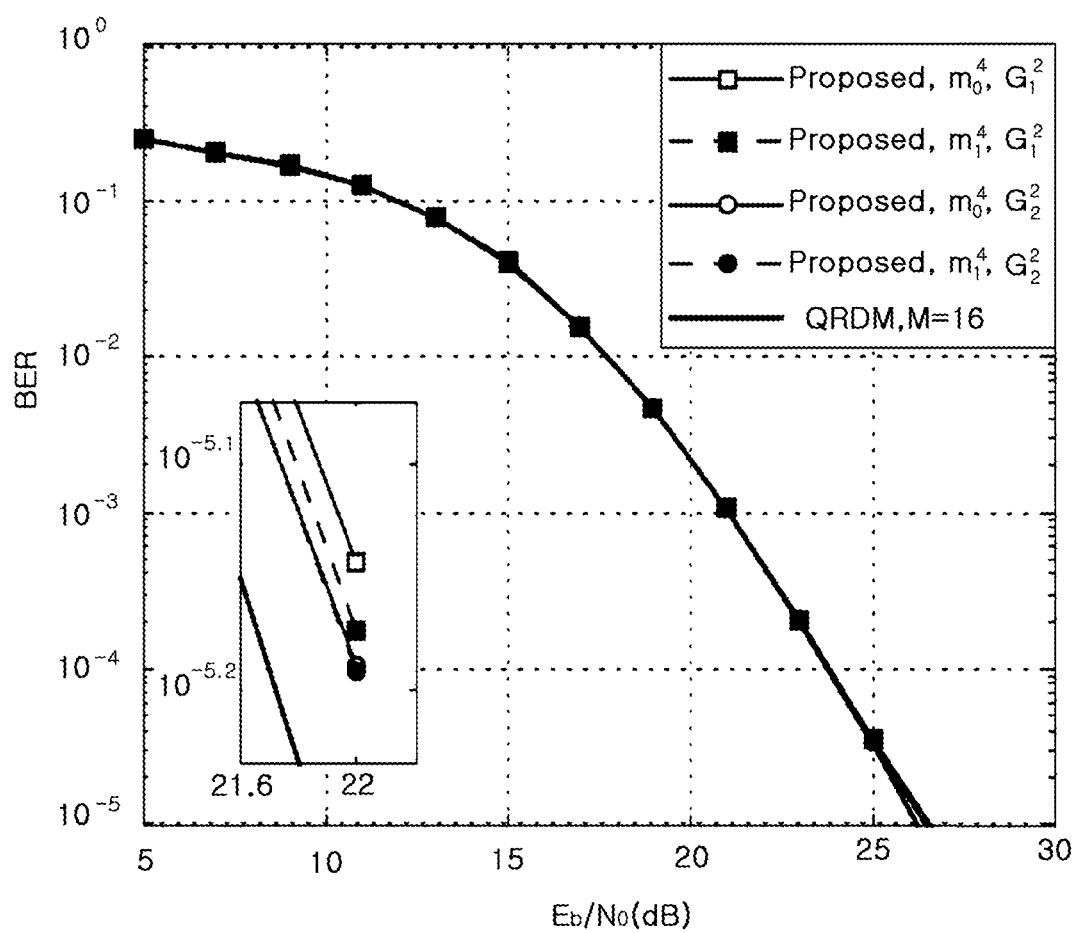
FIG. 8A is a diagram showing the BER performance of the algorithm proposed in the present invention when in the 4×4 MIMO system, X=4 and G=2 and the 16QAM modulation method is used.
Figure 8B:
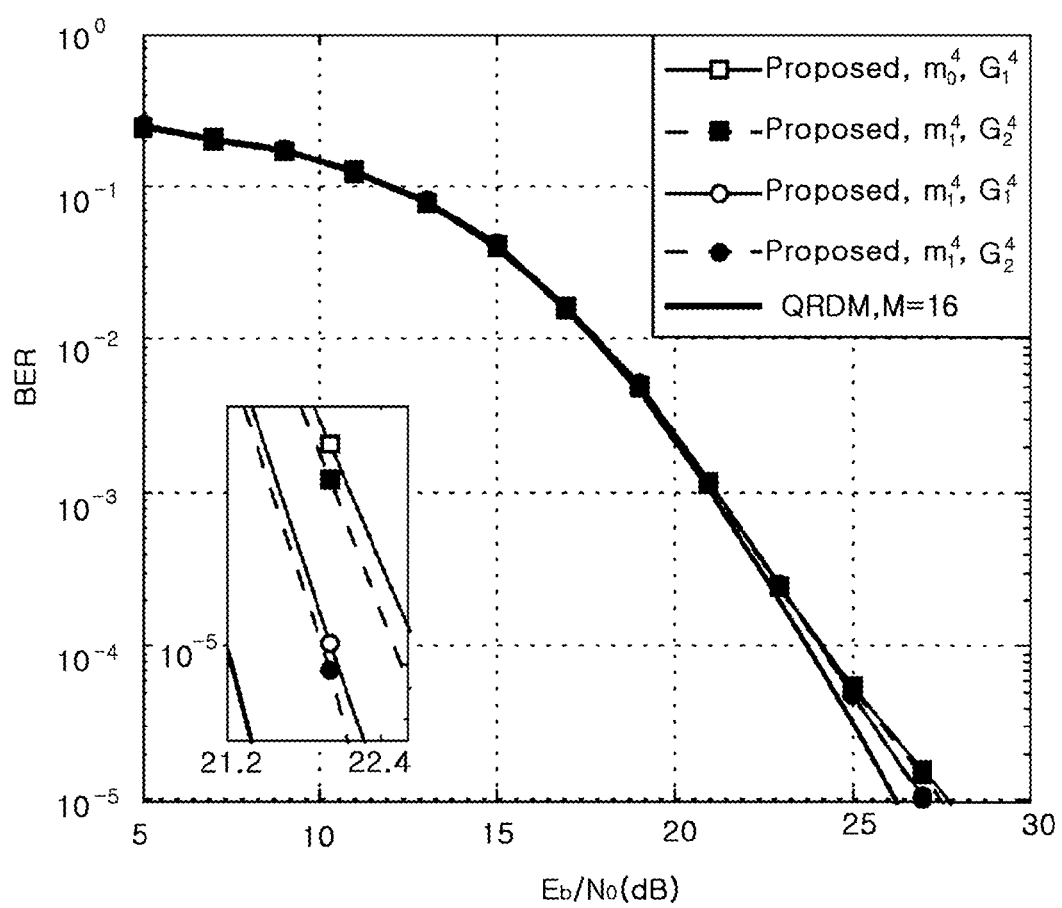
FIG. 8B is a diagram showing the BER performance of the algorithm proposed in the present invention when in the 4×4 MIMO system, X=4 and G=4 and the 16QAM modulation method is used.

FIG. 8A is a diagram showing the BER performance of the algorithm proposed in the present invention when in the 4×4 MIMO system, X=4 and G=2 and the 16QAM modulation method is used and FIG. 8B is a diagram showing the BER performance of the algorithm proposed in the present invention when in the 4×4 MIMO system, X=4 and G=4 and the 16QAM modulation method is used. It can be appreciated from FIGS. 8A and 8B that the algorithms according to the present invention can improve the BER performance as compared with the existing QRDM algorithm.

As set forth above, according to exemplary embodiments of the present invention, it divides the tree search process of the QRDM algorithm into the plurality of PDPs by the continuous or dispersive grouping and performs each partial detection phase in parallel (APQRDM algorithm) or iteratively performs each partial detection phase (AIQRDM algorithm).

Further, according to exemplary embodiments of the present invention, the APQRDM algorithm performs the signal detecting process in parallel to significantly reduce the detection delay as compared to the existing QRDM algorithm and reduce the average operation complexity at 12 dB to about 43.5% of the existing QRDM algorithm.

In addition, according to exemplary embodiments of the present invention, the AIQRDM algorithm iteratively performs the signal detecting process to reduce hardware and memory demands and reduces the average operation complexity at 0 dB to about 54.2% of that of the existing QRDM algorithm.

While the present invention has been shown and described in connection with the exemplary embodiments, it will be apparent to those skilled in the art that modifications and variations can be made without departing from the spirit and scope of the invention as defined by the appended claims.

What is claimed is:

1. A signal detection method executed by a processor provided in a receiver of a multiple-input multiple-output system, comprising:
   dividing a constellation set into a plurality of subsets by grouping the constellation set;
   dividing a tree search process of a QR-decomposition with M-algorithm (QRDM) algorithm into a plurality of partial detection phases based on the grouped constellation set; and
   performing the plurality of partial detection phases in parallel, wherein each of the partial detection phases calculates a distance of each branch and calculates minimum accumulated distance per partial detection phase or
   performing plurality of partial detection phases iteratively, wherein at each detecting level, optimal estimated signals and the accumulated distances of the corresponding estimated signals are obtained
   wherein dividing the constellation set into the plurality of subsets divides the constellation set into a plurality of subsets having same cardinality by continuous or dispersive grouping.

2. The signal detection method of claim 1, wherein an adaptive QRDM (AQRDM) algorithm is applied to each of the plurality of partial detection phase.

3. The signal detection method of claim 2, wherein symbols determined at an Nth detecting level of an ith partial detection phase (i and N are any natural number) among the plurality of partial detection phases are selected among elements of an ith subset.

4. The signal detection method of claim 2, wherein the maximum value of the number of branches remaining at each detecting level is preset as m=[m2, m3, ..., mN].

5. The signal detection method of claim 1, wherein when the partial detection phases are performed in parallel, performing partial detection phases includes:
   calculating the distances of each branch and the minimum accumulated distances of each detecting level;
   calculating thresholds using the minimum accumulated distances;
   removing symbols having the minimum accumulated distance calculated at each detecting level larger than the thresholds; and
   selecting mN symbols having the minimum accumulated distances among the remaining symbols when the number of remaining symbols is larger than the preset value mN,
   wherein the calculating of the minimum accumulated distances, the calculating of the thresholds, the removing of the symbols, and the selecting of the symbols are iteratively performed at each detecting level to obtain the optimal estimated signals and the accumulated distances of the estimated signals at each partial detection phase.

6. The signal detection method of claim 5, further comprising selecting estimated signals having minimum accumulated distances among the accumulated distances of the optimal estimated signals obtained at each partial detection phase as optimal values.

7. The signal detection method of claim 1, wherein when the partial detection phases are performed iteratively, the partial detection phase includes:
   calculating the thresholds of each detecting level;
   removing symbols having the accumulated distances larger than the thresholds; and
   selecting mN symbols having the minimum accumulated distances among the remaining symbols when the number of remaining symbols is larger than the preset value mN,
   wherein the calculating of the thresholds, the removing of the symbols, and the selecting of the symbols are iteratively performed at each detecting level to obtain the optimal estimated signals and the accumulated distances of the estimated signals at each partial detection phase, and
   the partial detection phase receives a received signal vector y, R obtained by performing QR decomposition on a channel matrix, an accumulated distance $\zeta$ of the optimal estimated signals estimated until now, and a kth subset Ak.

8. The signal detection method of claim 7, wherein when the minimum accumulated distances calculated at each detecting level are equal to or larger than the accumulated distance $\zeta$ of the optimal estimated signals estimated until now, the iterative process stops without correcting the accumulated distance $\zeta$ and the detecting signal.

9. The signal detection method of claim 7, wherein when the minimum accumulated distances calculated at each detecting level are less than the accumulated distance $\zeta$ of the optimal estimated signals estimated until now, the smaller one of the calculated threshold and the $\zeta$ value is set to a threshold.

* * * * *